J. F. ZAK.
BUTTON.
APPLICATION FILED OCT. 25, 1916.
1,216,535.
Patented Feb. 20, 1917.
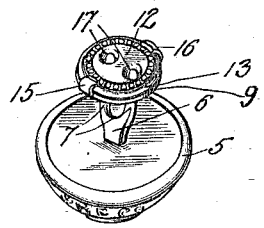
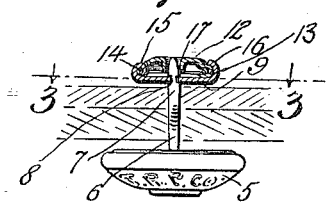
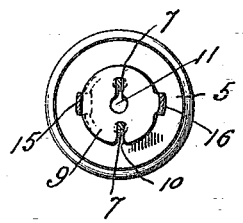
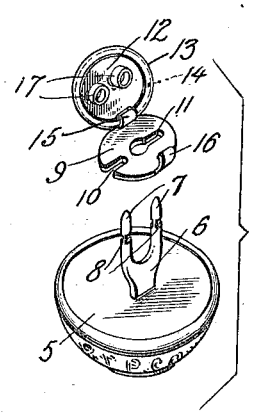
Inventor
J. F. Zak.
By
Attorneys.

UNITED STATES PATENT OFFICE.

JOHN F. ZAK, OF CHICAGO, ILLINOIS.

BUTTON.

1,216,535.   Specification of Letters Patent.   Patented Feb. 20, 1917.

Application filed October 25, 1916. Serial No. 127,603.

*To all whom it may concern:*

Be it known that I, JOHN F. ZAK, a citizen of the United States, residing at Chicago, in the county of Cook and State of Illinois, have invented new and useful Improvements in Buttons, of which the following is a specification.

This invention relates to buttons of the type in which two sections are separably connected for attachment to and removal from the garment or other part.

The device is especially adapted for military and ornamental buttons, and the invention has for its object to provide a button which can be quickly detached for the purpose of cleaning or polishing the same, and which can also be readily put back in place, and which will remain in a fixed position on the garment, said position being the correct height above the fabric, and with the ornamental design or lettering held upright, the button being securely held against a rotary movement.

With the object stated in view, the invention consists in a novel combination and arrangement of parts to be hereinafter described and claimed, and in order that the same may be better understood, reference is had to the accompanying drawing forming a part of this specification.

In the drawing,

Figure 1 is a perspective view of the button;

Fig. 2 is a side elevation of the button, partly in section and applied;

Fig. 3 is a cross-section on the line 3—3 of Fig. 2, and

Fig. 4 is a perspective view of the button showing its sections separated.

Referring specifically to the drawing, 5 denotes the head or main portion of the button, the same being provided with a shank 6 which is bifurcated, forming two laterally spaced branches 7 at its extremity. The branches of the shank are transversely grooved on opposite sides near their outer ends, as shown at 8.

The means for securing the button is a disk 9 detachably connected to the shank 6. The disk has an edge recess 10 and an aperture 11, which latter is in the form of a key-hole slot, the same being in radial alinement with the recess. The shank branches 7 are adapted to engage respectively the recess and the slot.

In use the shank 6 is inserted through the fabric, and the disk 9 is placed so that the shank branches 7 register respectively with the recess 10 and the inner end of the keyhole slot 11. The parts are then moved relative to each other so as to bring the shank branches into the inner end of the recess and the corresponding end of the slot. The edges of the recess and the slot seat in the grooves 8, whereby endwise separation of the shank and the disk is prevented. The grooves 8 form a neck or reduced portion on the shank branches corresponding to the width of the recess and the slot, the inner end of the latter, however, being enlarged so that one of the shank branches may be inserted thereinto, after which, by a sidewise movement of the disk, the latter is properly positioned on the shank branches.

In order to lock the disk 9 on the shank branches 7, the following device is provided:

To the edge of the disk 9 is hinged a cap 12 in such a manner that it may be swung over the outer face of the disk to cover the same. The cap is a disk with its edge turned inward as shown at 13. Within this inturned edge is housed a ring 14, and a portion of the edge is cut away to expose the ring. On the edge of the disk 9 is an ear 15 forming a hinge knuckle through which the exposed portion of the ring passes, said knuckle seating in the space formed by cutting away the inturned edge of the cap. On the edge of the disk 9, diametrically opposite the hinge of the cap, is an outstanding lug 16 serving as a catch to hold the cap seating by snapping over the rounded edge thereof. The ring 14 is resilient and tends to force the cap forward and under the lug 16 to hold it locked in closing position until forced out when desired.

When the cap 12 is swung down on top of the disk 9, and locked by the catch 16, the disk is securely locked on the shank branches 7. The cap has apertures 17 in line with the shank branches which serve to show the points of the latter in proper place before being locked in, and they also give the cap the appearance of a reinforcement of the button.

I claim:—

The combination with a button having a bifurcated shank the end portions of which are transversely grooved; of a disk having a radial edge recess and a slot enlarged at one end and in alinement with the recess, said recess and slot receiving respectively the branches of the button shank, and their edges seating in the grooves thereof, a cap hinged to the disk and adapted to seat on the outer face thereof over the ends of the shank branches, said cap having an inturned edge, a ring housed under said edge, a portion of the edge being recessed to expose the ring, and a hinge knuckle on the disk and engageable by the exposed portion of the ring.

In testimony whereof I affix my signature.

JOHN F. ZAK.

Copies of this patent may be obtained for five cents each, by addressing the "Commissioner of Patents, Washington, D. C."